UNITED STATES PATENT OFFICE.

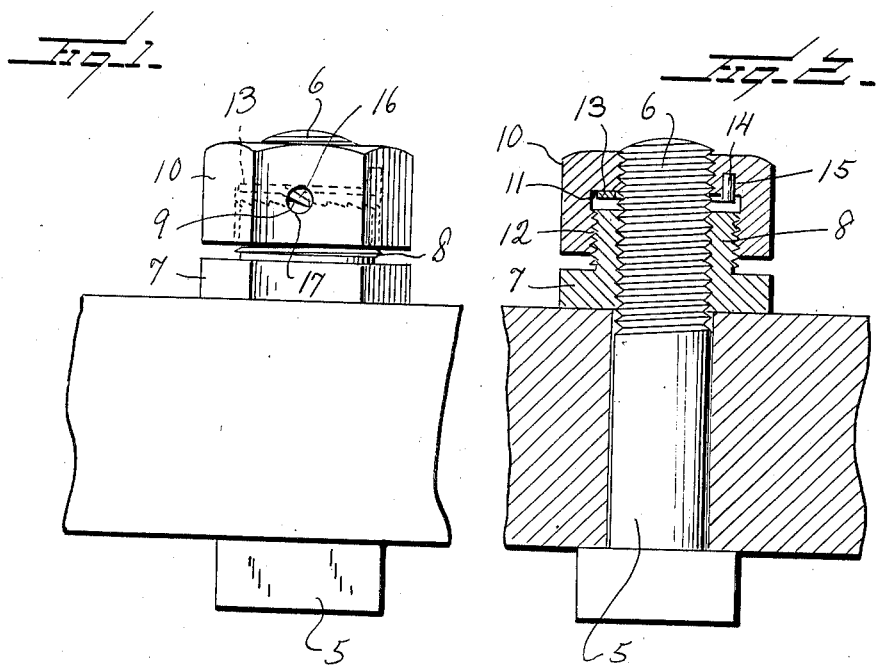
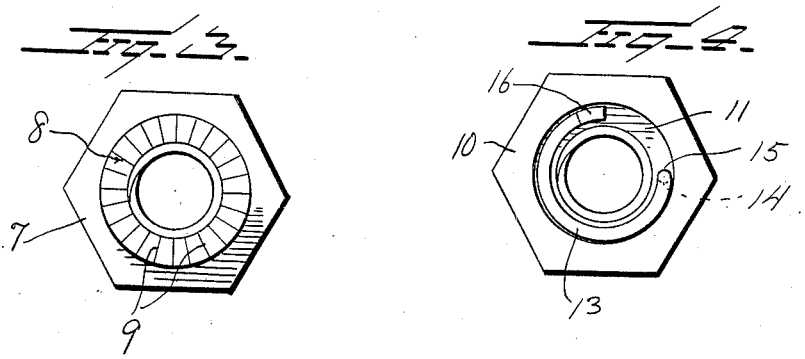
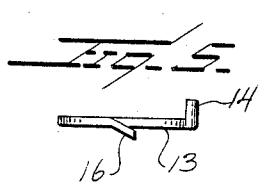

FERDINAND LE FAUVE, OF BUFFALO, NEW YORK.

LOCK-NUT.

1,357,331.  Specification of Letters Patent.  Patented Nov. 2, 1920.

Application filed May 29, 1920. Serial No. 385,338.

*To all whom it may concern:*

Be it known that I, FERDINAND LE FAUVE, a citizen of the United States, residing at Buffalo, in the county of Erie and State of New York, have invented certain new and useful Improvements in Lock-Nuts, of which the following is a specification, reference being had to the accompanying drawings.

This invention relates to lock nuts and has for its object to provide a device of this character which firmly locks the nut on the bolt and cannot be dislodged by vibration.

Another object is to provide a lock nut of this character wherein one portion of the device is provided with ratchet teeth and the other portion provided with a spring pawl, said pawl permitting rotation of the nut in one direction but preventing rotation in the opposite direction.

Another object of the invention is to provide a device of this character wherein the portion of the device containing the pawl is provided with an opening through which an implement may be inserted to disengage the pawl and permit removal of the nut when desired.

A still further object of the invention is to provide a device of this character, one section of which is provided with a threaded extension adapted to be received in the recess of a second section, the second section being provided with a spring pawl which extends around the bottom of the recess and has its ends disposed in spaced relation to each other, said pawl not only engaging the ratchet teeth but is also positioned to be penetrated along its entire surface by the ratchet teeth when the sections are engaged with each other.

With these and other objects in view, the invention consists in the improved construction and arrangement of parts to be hereinafter more particularly described, fully claimed and illustrated in the accompanying drawings, in which:—

Figure 1 is a vertical elevation of a nut lock constructed in accordance with an embodiment of the invention, Fig. 2 is a sectional view of the structure shown in Fig. 1, Fig. 3 is a plan view of one of the nut sections showing the ratchet teeth on the extension, Fig. 4 is a plan view of the other nut section showing the recess and the locking pawl therein, and Fig. 5 is a detail side elevation of the pawl.

Referring to the drawings, 5 designates a bolt of a conventional type including the usual threads 6. A nut 7 is provided for engagement with the bolt, said nut having a portion of its periphery reduced to provide an extension 8, said extension being externally threaded with one size of thread while the usual opening of the nut and extension is provided with a larger size of thread. The end of the extension has a plurality of ratchet teeth 9 formed therein, said teeth extending in an endless formation around the end of the extension.

In order to lock the bolt in engagement with the work, a locking nut section 10 is provided, said nut having a recess formed in one end thereof, said recess including an end wall 11, and threaded side walls 12. The threads of said side walls, correspond to the exterior threads of the extension 8 while the threads in the usual central opening of the nut 10 correspond to the threads in the central opening of the nut 7. By providing the nuts 7 and 8 with different size threads one size for engagement with the bolt and a smaller size for engagement with each other, as the sections are rotated upon one another it causes the larger thread to bind on the bolt as the movement of the nuts 7 and 10 toward each other is more gradual than that of the rotation of the nuts on the bolt toward each other so that a binding action results.

In addition to this, to prevent vibration or like forces from causing rotation of the nut 10 on the nut 7 when the bolt is engaged with work, a spring pawl 13 is provided. This pawl consists of a length of resilient material which is curved longitudinally upon itself to conform to the end wall 11 of the recess in the nut. The end 14 of the pawl is extended in right-angular relation to said pawl and is rounded for engagement with an opening 15 provided in the end wall 11 of the recess. The end 16 of the pawl is sprung in the opposite direction to that of the end portion 14. It will be noted that the upper and lower surfaces of the pawl 13 are flat. This not only permits the pawl to be disposed in snug engagement with the end wall 11, but also permits the ratchet teeth 9 to bite into the pawl should it be desired to provide security in addition to the binding of the sections on the bolt and engagement of the end 16 with the ratchet teeth 9. An opening 17 is formed in the periphery of the nut 10, one portion of the wall of said opening lying flush with the adjacent portion of the end wall 11. This opening is disposed in spaced relation to the opening 15 so that it is disposed closely adjacent the end 16 of the pawl. After the nut 10 has been engaged with the extension 8 and the sections locked by means of the pawl 13, the nut may be unlocked if so desired by inserting a suitable implement such as a nail or strong piece of wire through the opening 17, so as to disengage the end 16 of the pawl from the ratchet teeth 9. The nut 10 can then be readily rotated in the opposite direction to permit removal of the nut 7 from the bolt. It is of course, not necessary to provide any securing means for the end 14 of the pawl as the engagement of the extension 8 with the pawl serves to retain the same within the recess of the nut 10, rotation of the pawl within said recess being prevented by the end 14.

It will thus be seen that this invention provides a lock nut capable of performing three locking operations, namely that of providing two sizes of threads, one for engagement with the bolt and the other for the engagement of the sections of the device with each other, the sprung end 16 of the pawl in engagement with the ratchet teeth to prevent reverse rotation of the nut 10, and the forcing of the nut 10 into the limit of its movement upon the extension 8 to cause the ratchet teeth 9 to bite into the confronting surface of the pawl 13.

Another important feature of this device is that the holding power of the bolt is not interfered with by the formation of grooves or lugs on the bolt. This permits any bolt to be used in connection with this device as no alterations are necessary.

What is claimed is:—

A nut lock comprising a nut having an endless series of ratchet teeth projecting from one end thereof, a nut lock having a recess in one end arranged to receive the nut and a resilient pawl disposed in engagement with the end wall of said recess, the pawl extending substantially around said end wall and having its end portions disposed adjacent each other, said ratchet teeth being arranged to simultaneously penetrate the surface of the pawl longitudinally thereof.

In testimony whereof I hereunto affix my signature.

FERDINAND LE FAUVE.